United States Patent
Onuma et al.

(10) Patent No.: US 10,882,513 B2
(45) Date of Patent: Jan. 5, 2021

(54) HYBRID VEHICLE

(71) Applicant: Honda Motor Co., Ltd., Tokyo (JP)

(72) Inventors: Kentaro Onuma, Saitama (JP); Hisashi Ito, Saitama (JP); Hidenori Sakai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 16/518,946

(22) Filed: Jul. 22, 2019

(65) Prior Publication Data

US 2020/0031333 A1 Jan. 30, 2020

(30) Foreign Application Priority Data

Jul. 24, 2018 (JP) ................................. 2018-138308

(51) Int. Cl.
*B60W 20/40* (2016.01)
*F01N 9/00* (2006.01)

(52) U.S. Cl.
CPC ............ *B60W 20/40* (2013.01); *F01N 9/002* (2013.01); *B60W 2510/068* (2013.01)

(58) Field of Classification Search
CPC .. B60W 20/40; B60W 2510/068; F01N 9/002
See application file for complete search history.

(56) References Cited

U.S. PATENT DOCUMENTS

| | | | | |
|---|---|---|---|---|
| 2012/0208672 A1* | 8/2012 | Sujan | ................... | B60W 10/26 477/5 |
| 2016/0339905 A1* | 11/2016 | Inoue | ...................... | B60K 6/26 |
| 2016/0368483 A1* | 12/2016 | Nawata | ................. | B60W 20/13 |
| 2017/0203645 A1* | 7/2017 | Imai | ...................... | B60W 10/08 |
| 2018/0099656 A1* | 4/2018 | Otsuka | ................... | B60W 20/40 |
| 2018/0216552 A1* | 8/2018 | Yokoi | ...................... | F01N 3/021 |
| 2018/0274673 A1* | 9/2018 | Sugai | ...................... | F01N 3/035 |
| 2019/0168735 A1* | 6/2019 | Morisaki | ............... | B60W 20/16 |
| 2020/0031333 A1* | 1/2020 | Onuma | ................... | F01N 3/023 |
| 2020/0063675 A1* | 2/2020 | Ikeda | ...................... | F01N 3/101 |
| 2020/0139957 A1* | 5/2020 | Muta | ..................... | B60W 20/15 |
| 2020/0223426 A1* | 7/2020 | Hara | ................... | F02D 41/0245 |

FOREIGN PATENT DOCUMENTS

| JP | 2005048740 | 2/2005 |
|---|---|---|
| JP | 2017136935 | 8/2017 |
| JP | 2018083570 | 5/2018 |

OTHER PUBLICATIONS

"Office Action of Japan Counterpart Application", dated Jul. 21, 2020, with English translation thereof, p. 1-p. 6.
"Office Action of Japan Counterpart Application," with machine English translation thereof, dated Jan. 14, 2020, p. 1-p. 8.

* cited by examiner

Primary Examiner — Erez Gurari
(74) Attorney, Agent, or Firm — JCIPRNET

(57) ABSTRACT

A hybrid vehicle is provided. A vehicle V has a gasoline particulate filter (GPF) provided on an exhaust passage to capture particulate matter (PM) included in exhaust, a generator motor connected to a crank shaft of an engine, an exhaust temperature sensor acquiring a filter temperature correlated with a temperature of the GPF, and an electronic control unit (ECU) performing motor drive control for rotating the crank shaft with the generator motor when a filter temperature is higher than or equal to a PM combustion start temperature and a PM combustion integration amount that is an integration amount of PM combusted in the GPF is less than a PM discharge integration amount.

20 Claims, 11 Drawing Sheets

HYBRID VEHICLE

CROSS-REFERENCE TO RELATED APPLICATION

This application claims the priority of Japan patent application serial no. 2018-138308, filed on Jul. 24, 2018. The entirety of the above-mentioned patent application is hereby incorporated by reference herein and made a part of this specification.

BACKGROUND

Technical Field

The present disclosure relates to a hybrid vehicle. More specifically, the disclosure relates to a hybrid vehicle with a filter that traps particulate matter included in exhaust of an engine and a motor connected to the output shaft of the engine.

Description of Related Art

A vehicle in which an engine functioning as a driving force generation source is mounted has a filter that traps particulate matter (which may be abbreviated as "PM" below) included in exhaust of the engine (refer to Patent Document 1 (Japanese Patent Laid-Open Publication No. 2017-136935)). PM trapped by the filter is appropriately combusted and removed by the high-temperature exhaust while the vehicle travels.

When PM trapped by the filter is combusted, the temperature of the filter increases accordingly. However, the highest temperature of the filter at that time becomes higher as the amount of PM deposited in the filter becomes larger and the concentration of oxygen included in the exhaust flowing into the filter due to the fuel cutting function or the like becomes higher. Thus, if the PM which has been deposited in the filter in a larger amount than a predetermined allowable upper limit (which will be referred to as an "excessive deposition state") is combusted, the temperature of the filter rises higher than the guaranteed temperature and there is concern of the filter undergoing melting damage. Thus, a vehicle that performs excessive deposition prevention control has been recently proposed to avoid deposition of a larger amount of PM than the determined allowable upper limit that has been set to prevent melting damage of the filter.

However, when the fuel cutting function caused by deceleration is executed, new air including a large amount of oxygen flows into the filter having a high temperature due to acceleration, and thus PM deposited in the filter is combusted and the amount of PM deposited in the filter decreases. Thus, a vehicle performing the fuel cutting function of the engine when it decelerates need not actively perform the above-described excessive deposition prevention control. However, hybrid vehicles having both an engine and a motor as a driving force generation source have fewer chances of executing the fuel cutting function than normal vehicles only having an engine as a driving force generation source. For this reason, hybrid vehicles tend to have a larger amount of PM retained in filters than normal vehicles, and thus are particularly required to execute the excessive deposition prevention control.

Patent Document 1 proposes a hybrid vehicle tending to have a large amount of deposited PM that stops fuel injection of the engine and causes the motor to rotate the output shaft of the engine when a temperature of the filter is higher than or equal to a predetermined reference temperature. Accordingly, new air absorbed into the engine in the non-combustion state is supplied to the filter having the reference temperature or higher, the PM trapped by the filter is removed by combustion, and thus excessive deposition in the filter can be prevented.

PATENT DOCUMENTS

[Patent Document 1] Japanese Patent Laid-Open Publication No. 2017-136935

Patent Document 1, however, does not sufficiently consider a timing appropriate for executing idle run control of the engine using the motor. In other words, in the disclosure of Patent Document 1, idle run control is performed when the filter is at the reference temperature or higher. Thus, according to the disclosure of the Patent Document 1, while excessive deposition can be prevented, idle run control is performed more frequently than necessary, and thus there is concern of energy such as a fuel or electric power being wasted.

SUMMARY

A hybrid vehicle according to the present disclosure (e.g., the vehicle V which will be described below) has a filter (e.g., the gasoline particulate filter (GPF) 33 which will be described below) provided on an exhaust passage (e.g., the exhaust pipe 32 which will be described below) of an engine to capture particulate matter included in exhaust, a motor (e.g., the generator motor GM which will be described below) connected to an output shaft (e.g., the crank shaft 17 which will be described below) of the engine, a temperature acquisition part (e.g., the exhaust temperature sensor 43 and the electronic control unit (ECU) 7 which will be described below) acquiring a filter-correlated temperature correlated with a temperature of the filter, and a control part (e.g., the ECU 7 which will be described below) performing motor drive control for rotating the output shaft with the motor when the filter-correlated temperature is higher than or equal to a reference temperature and a particulate matter combustion amount that is an integration amount of particulate matter combusted in the filter is smaller than a combustion amount threshold.

DESCRIPTION OF THE EMBODIMENTS

Figure 1:
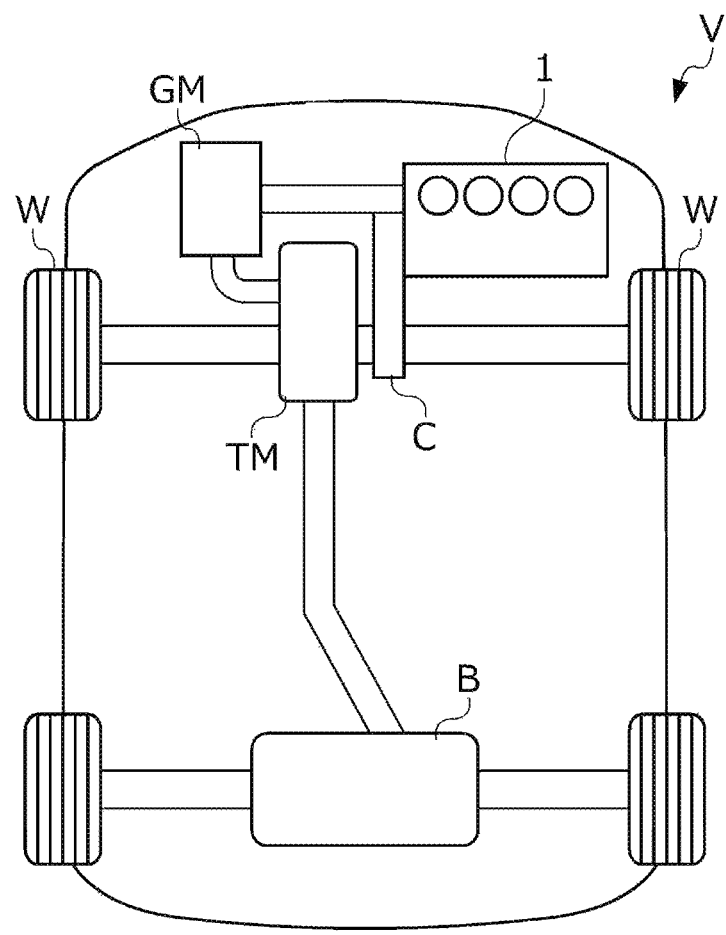
FIG. 1 is a diagram illustrating a configuration of a vehicle according to an embodiment of the present disclosure.

The disclosure provides a hybrid vehicle that can perform idle run control of the engine for preventing excessive deposition at proper timings without wasting energy such as a fuel or electric power.

According to an embodiment, the control part may assume that an allowable upper limit amount of particulate matter has been deposited in the filter and calculate a combustion integration amount of particulate matter combusted from a start of the engine in the filter as the particulate matter combustion amount.

According to the embodiment, the control part may calculate the particulate matter combustion amount based on the filter-correlated temperature and an operation state of the engine.

According to the embodiment, the control part may calculate a discharge integration amount of particulate matter discharged from a start of the engine as the combustion amount threshold.

According to the embodiment, the control part may calculate the combustion amount threshold based on an engine RPM, an intake air amount, and an engine water temperature.

According to the embodiment, when a start-time water temperature that is an engine water temperature at a time of a start of the engine is in a predetermined temperature-rise range, the control part may execute temperature rise control for raising temperatures of the engine and exhaust of the engine, and when the start-time water temperature is equal to or lower than a lower limit of the temperature-rise range, the control part may execute the motor drive control.

According to the embodiment, the control part may estimate a deposition amount of particulate matter of the filter and perform the motor drive control until the deposition amount becomes equal to or smaller than an end threshold when the deposition amount exceeds a start threshold in a state where the start-time water temperature is higher than or equal to the lower limit of the temperature-rise range.

According to the embodiment, the engine may be a gasoline engine using gasoline as a fuel.

According to the embodiment, the control part may execute the motor drive control at least under conditions that a travel range is a forward range, a vehicle speed is higher than or equal to a predetermined reference vehicle speed, and a required driving force is smaller than a predetermined reference driving force.

Some of particulate matter discharged from the engine and captured by the filter that has not been combusted with heat of exhaust is deposited in the filter. Thus, it is important to know the amount of the particulate matter combusted in the filter in order to prevent excessive deposition in the filter with efficiency. Therefore, the hybrid vehicle of the present disclosure performs the motor drive control for rotating the output shaft of the engine with the motor when the filter-correlated temperature is higher than or equal to the reference temperature and the particulate matter combustion amount that is an integration amount of particulate matter combusted in the filter is smaller than the combustion amount threshold. Accordingly, the motor drive control is executed when the particulate matter combustion amount is smaller than the combustion amount threshold, that is, particulate matter needs to be actively combusted to prevent excessive deposition, and the combustion of the particulate matter deposited in the filter can be promoted. In addition, the motor drive control can be prevented from being performed when the particulate matter combustion amount is greater than or equal to the combustion amount threshold, that is, most particulate matter captured in the filter has already been combusted and thus excessive deposition will not occur. Accordingly, waste of energy such as a fuel and electric power for executing the motor drive control can be curbed.

Particulate matter particularly increases immediately after a start of the engine and is discharged from the engine. Thus, the control part calculates the combustion integration amount of particulate matter combusted in the filter immediately after the start of the engine when a particularly large amount of particulate matter can be discharged, sets the amount as the particulate matter combustion amount, and determines a timing at which the motor drive control is executed based on the particulate matter combustion amount. Accordingly, the motor drive control can be executed at the right time, and further waste of energy needed for executing the motor drive control can be curbed. In addition, in the present disclosure, the control part assumes that the allowable upper limit amount of particulate matter has been deposited in the filter when calculating the particulate matter combustion amount. As the deposition amount of particulate in the filter increases, the amount of particulate matter combusted in the filter increases as described above, and thus the particulate matter combustion amount is estimated to be greater than the actual amount. Thus, according to the present disclosure, the execution frequency of the motor drive control is lower than when the particulate matter combustion amount is calculated using the actual particulate matter deposition amount, and thus waste of energy such as a fuel and electric power for executing the motor drive control can be curbed accordingly. However, while there is concern of the particulate matter deposition amount increasing in the filter due to the low execution frequency of the motor drive control in this case, the particulate matter combustion amount is calculated on the assumption that the allowable upper limit amount of particulate matter has been deposited in the filter according to the present disclosure as described above, and thus it is possible to prevent the actual deposition amount from exceeding the allowable upper limit amount.

According to the embodiment, the control part may calculate the particulate matter combustion amount based on the filter-correlated temperature correlated with the particulate matter combustion amount and an operation state of the engine. Accordingly, since the particulate matter combustion amount can be calculated with high accuracy, the motor drive control can be executed at the right time, and further waste of energy needed for executing the motor drive control can be curbed.

As will be described below with reference to FIG. 5, the discharge integration amount of particulate matter discharged from the start of the engine significantly increases in the process of warm-up of the engine. Thus, the control part may set the discharge integration amount of particulate matter discharged from the start of the engine as the combustion amount threshold that is the threshold with respect to the particulate matter combustion amount. Accordingly, the motor drive control can be executed at the right time in the process of warm-up of the engine in which the deposition amount is likely to significantly increase.

According to the embodiment, the control part may calculate the combustion amount threshold that is the discharge integration amount of the particulate matter discharged from the start of the engine based on an engine RPM, an intake air amount, and an engine water temperature. Accordingly, since the combustion amount threshold can be calculated with high accuracy, the motor drive control can be executed at the right time, and further waste of energy needed for executing the motor drive control can be curbed.

According to the embodiment, when the start-time water temperature is in the predetermined temperature-rise range, the control part may execute temperature rise control, and thereby temperatures of the engine and exhaust of the engine are raised and further exhaust purification performance of the exhaust purification device is improved. In addition, when such temperature rise control is executed, the temperature of the exhaust increases, and thus particulate matter captured in the filter is combusted accordingly. However, when the start-time water temperature is excessively low, more specifically, when the start-time water temperature is lower than the lower limit of the temperature-rise range, it is difficult to improve the exhaust purification performance in an early stage even if the temperature rise control is performed, there is concern of fuel efficiency deteriorating, and therefore the control part does not execute the temperature rise control. Thus, when the start-time water temperature is equal to or lower than the lower limit of the temperature-rise range and the temperature rise control is not executed, the control part performs the motor drive control. Accordingly, excessive deposition in the filter can be prevented at the time of a low-temperature start of the vehicle at which the deposition amount of particulate matter easily increases in the filter.

When the start-time water temperature is in the predetermined temperature-rise range as described above, while the temperature rise control is executed, the deposition amount of particulate matter in the filter may gently increase and exceed the allowable upper limit amount. Thus, when the deposition amount exceeds the start threshold in a state in which the start-time water temperature is higher than or equal to the lower limit of the temperature-rise range, the control part performs the motor drive control until the deposition amount becomes equal to or smaller than the end threshold. Accordingly, it is possible to prevent the deposition amount from greatly exceeding the allowable upper limit amount.

Since gasoline engines have a higher exhaust temperature than diesel engines, the deposition amount of particulate matter of the filter tends to converge on a predetermined saturated deposition amount even if a forced regeneration process as in DPFs used in diesel engines is not periodically performed. However, since the chances for hybrid vehicles in which gasoline engines are mounted to execute fuel cutting to promote combustion of particulate matters as described above are limited, the saturated deposition amount may exceed the allowable upper limit amount that is determined to prevent melting damage of the filter. With respect to this, the control part performs the motor drive control for rotating the output shaft of the engine with the motor when the filter-correlated temperature is higher than or equal to the reference temperature and the particulate matter combustion amount is smaller than the combustion amount threshold. Accordingly, the motor drive control can be performed at the right timing to prevent the saturated deposition amount from exceeding the allowable upper limit amount.

When the travel range is not the forward range, or the vehicle speed is lower than the reference vehicle speed, a sufficient amount of air is not supplied to the filter even if the motor drive control is executed, and the effect of combusting particulate matter is small. In addition, since it is difficult to generate a driving force with the engine in the motor drive control, if the motor drive control is executed in a state in which a required driving force is greater than the reference driving force, a driving force according to the required driving force may not be generated and power performance of the vehicle may deteriorate. Thus, the control part executes the motor drive control on the condition that the travel range is the forward range, the vehicle speed is higher than or equal to the predetermined reference vehicle speed, and the required driving force is smaller than the predetermined reference driving force. Accordingly, the motor drive control can be executed without lowering the power performance of the vehicle, and particulate matter can be effectively combusted through the motor drive control.

An embodiment of the present disclosure will be described below with reference to the drawings. FIG. 1 is a diagram illustrating a configuration of a vehicle V according to the present embodiment. The vehicle V is a so-called hybrid vehicle having an engine 1 and a drive motor TM as driving force generation sources. More specifically, the vehicle V has the engine 1, a generator motor GM connected to the output shaft of the engine 1, a clutch C that connects and disconnects the output shaft of the engine 1 to and from drive wheels W, the drive motor TM with an output shaft connected to the drive wheels W, and a battery B that exchanges electric power with the drive motor TM via an inverter, a converter, or the like which is not illustrated.

The vehicle V can travel broadly in three travel modes which are EV travel, series travel, and engine travel modes.

In the EV travel mode, the vehicle V travels by driving the drive motor TM with electric power supplied from the battery B. During the EV travel mode, basically the engine 1 and the generator motor GM stop.

In the series travel mode, the vehicle V causes the clutch C to disconnect the engine 1 from the drive wheels W and causes the engine 1 to drive the generator motor GM. In addition, in the series travel mode, the electric power from the battery B and electric power generated by the generator motor GM described above are supplied to the drive motor TM.

In the engine travel mode, the vehicle V travels by causing the clutch C to connect the engine 1 and the drive wheels W and causing the engine 1 to drive the drive wheels W.

The travel mode of the vehicle V is basically set to the EV travel mode to perform deceleration regeneration with the drive motor TM when the vehicle decelerates, and the engine 1 stops. For this reason, the engine 1 of the vehicle V which is a hybrid vehicle has fewer chances to perform deceleration fuel cutting than normal vehicles having engines as the only driving force generation source.

Figure 2:
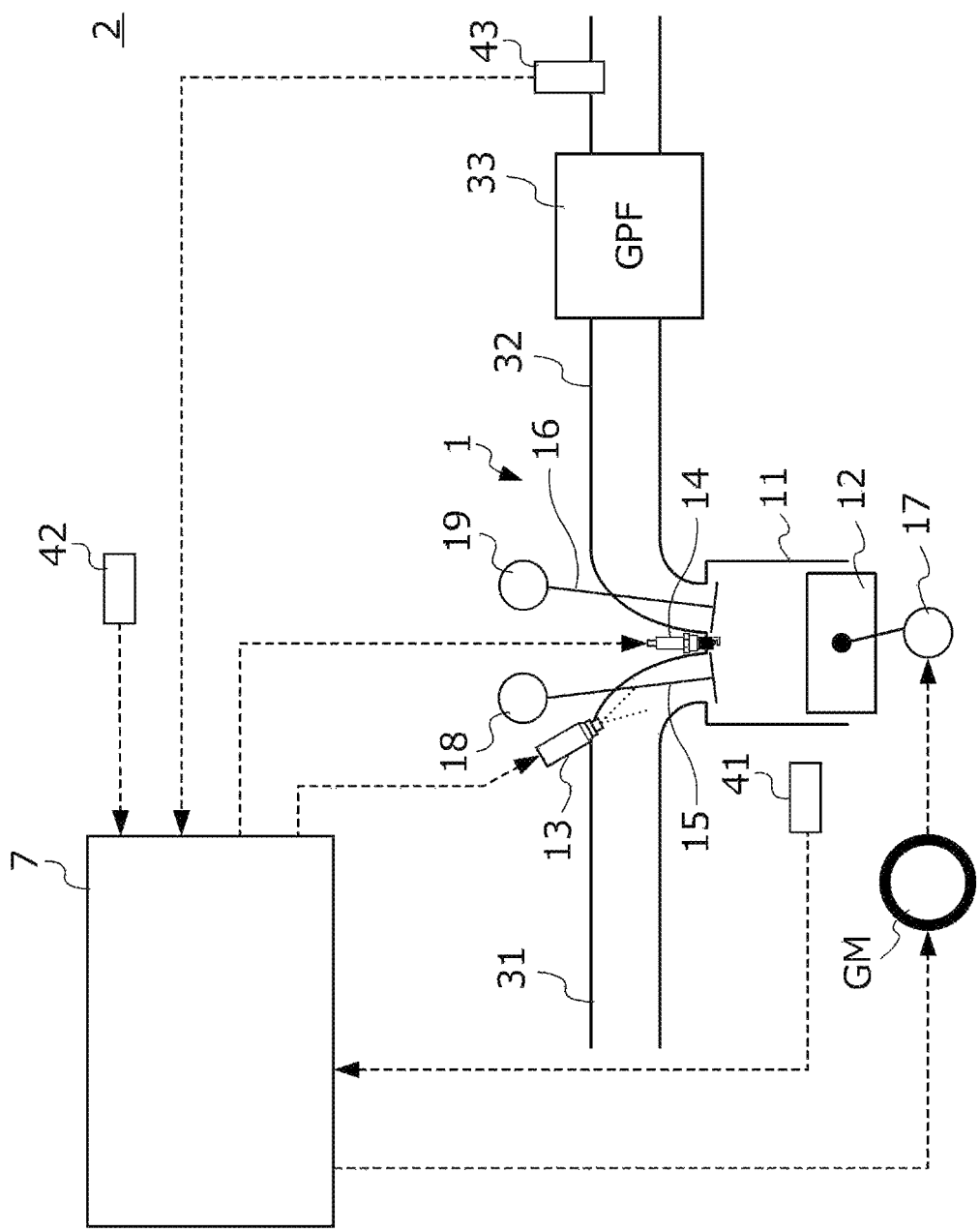
FIG. 2 is a diagram illustrating a configuration of an engine and an exhaust purification system thereof.

FIG. 2 is a diagram illustrating a configuration of the engine 1 and an exhaust purification system 2 thereof. The exhaust purification system 2 has the generator motor GM connected to the crank shaft 17 that is the output shaft of the engine 1 and an electronic control unit 7 (which will be referred to as "ECU 7" below) that controls the engine 1 and the generator motor GM.

The engine 1 is a multi-cylinder gasoline engine using gasoline as a fuel and having multiple cylinders 11 (only one is illustrated in FIG. 2). The engine 1 has a piston 12 provided in each cylinder 11, a fuel injection valve 13, and a spark plug 14 provided for each cylinder 11, an intake valve 15 provided at an intake port communicating with each cylinder 11, an intake pipe 31 guiding air to the intake port, an exhaust valve 16 provided in an exhaust port communicating with each cylinder 11, an exhaust pipe 32 in which exhaust flowing out from the exhaust port flows, and the crank shaft 17 linked to the piston 12 via a connecting rod.

The engine 1 has an intake cam shaft 18 and an exhaust cam shaft 19 connected to the crank shaft 17 via a timing belt and rotating according to rotation of the crank shaft 17. More specifically, the cam shafts 18 and 19 are designed to rotate once when the crank shaft 17 rotates twice. An intake cam driving opening and closing of the intake valve 15 is provided in the intake cam shaft 18, and an exhaust cam driving opening and closing of the exhaust valve 16 is provided in the exhaust cam shaft 19. Accordingly, when the cam shafts 18 and 19 rotate, the intake valve 15 and the exhaust valve 16 advance and retract (open and close) according to the profile of the cams provided in the cam shafts 18 and 19.

The exhaust pipe 32 has an exhaust particulate filter (which will be abbreviated as "GPF" below) that captures PM included in the exhaust of the gasoline engine. The GPF 33 is, for example, a wall flow type having a plurality of cells formed to be compartmented by a plurality of porous walls. That is, the GPF 33 captures PM in such a way that PM is deposited on the surfaces of the porous walls when the exhaust passes through the fine pores inside the porous walls. In addition, the porous walls of the GPF 33 support, for example, a three-way catalyst for purifying CO, HC, and $NO_X$ included in the exhaust.

Figure 3:
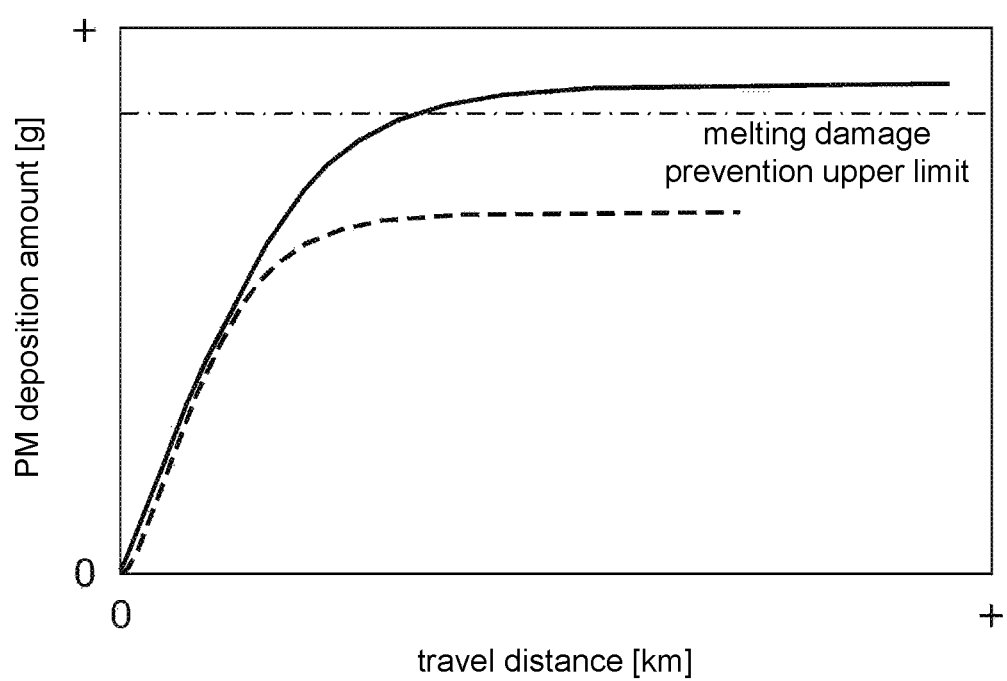
FIG. 3 is a diagram illustrating the relationship between the PM deposition amount and travel distance.

Here, the relationship between the PM deposition amount [g] that is the deposition amount of PM in the GPF 33 and the travel distance will be described with reference to FIG. 3. FIG. 3 is a diagram illustrating the relationship between PM deposition amount and travel distance. In FIG. 3, the solid line represents the change in the PM deposition amount of the GPF mounted in the hybrid vehicle of the present embodiment, and the dashed line represents the change in the PM deposition amount of the GPF mounted in a normal vehicle only having an engine as a driving force generation source.

As illustrated in FIG. 3, the PM deposition amount of the GPF increases as the travel distance becomes longer. More specifically, while the travel distance is short, that is, the PM deposition amount is small, the PM deposition amount increases substantially in proportion to the travel distance, and the PM deposition amount tends toward a predetermined constant amount as the travel distance becomes longer. The reason for this is as follows.

First, although the GPF captures substantially all PM discharged from the engine 1, some of the PM captured by the GPF is combusted due to heat of the discharge. Thus, if the amount of PM discharged from the engine per unit time is set to a PM discharge amount [g/s] and the amount of PM combusted in the GPF per unit time is set to a PM combustion amount [g/s], it is considered that, when the PM discharge amount is greater than the PM combustion amount, the PM deposition amount increases in proportion to the travel distance, and when the PM discharge amount is substantially equal to the PM combustion amount, the PM deposition amount is constant regardless of an increase of the travel distance. That is, since the PM combustion amount in the GPF increases as the PM deposition amount increases, the PM deposition amount is considered to converge on a fixed amount (which will also be referred to as a "saturated deposition amount" below) as the travel distance becomes longer.

In addition, the saturated deposition amount of the PM deposition amount of the GPF mounted in the hybrid vehicle (see the thick solid line in FIG. 3) is greater than the saturated deposition amount of the PM deposition amount of the GPF mounted in the normal vehicle (see the thick dashed line in FIG. 3) as illustrated in FIG. 3. That is, the GPF mounted in the hybrid vehicle is more stable than the GPF mounted in the normal vehicle when a great amount of PM is deposited. The reason for this is as follows.

The PM combustion amount of the GPF is considered to increase as the concentration of oxygen in exhaust becomes higher. Thus, when the fuel cutting function of temporarily setting a fuel injection amount of the engine 1 to 0 at the time of deceleration is executed, new air including a large amount of oxygen flows into the GPF that has been heated at the time of acceleration, and thus the PM combustion amount increases. On the other hand, since the hybrid vehicle of the present embodiment performs regenerative driving using the drive motor TM at the time of deceleration, it executes the fuel cutting function less frequently than normal vehicles. Thus, the hybrid vehicle has a smaller PM combustion amount than normal vehicles, and therefore the saturated deposition amount of the PM deposition amount thereof is considered to be greater.

The PM deposition amount of the GPF 33 mounted in the vehicle V which is a hybrid vehicle described above tends to be greater than the PM deposition amount of the GPF mounted in the normal vehicle, and thus the PM deposition amount is likely to be in an excessive deposition state in which the deposition amount exceeds a predetermined allowable upper limit set to prevent melting damage of the GPF. In addition, there is concern of the GPF 33 suffering melting damage as described above when the GPF 33 is in the excessive deposition state. Thus, the ECU 7 prevents the GPF 33 from being in the excessive deposition state by supplying new air including a large amount of oxygen to the GPF 33 at the right timing and performing excessive deposition prevention control for promoting combustion of PM deposited in the GPF 33 as will be described below with reference to FIG. 4.

Returning to FIG. 2, the crank shaft 17 of the engine 1 is connected to the output shaft of the generator motor GM via a power transmission mechanism, which is not illustrated. Thus, in the series travel mode, the vehicle can be caused to travel by the engine 1 driving the generator motor GM and supplying the electric power generated by the generator motor GM to the drive motor TM.

In addition, at the time of deceleration of the vehicle, fuel injection from the fuel injection valve 13 is stopped, the electric power stored in the battery B is supplied to the generator motor GM, and motor drive control for rotating the crank shaft 17 of the engine 1 with the generator motor GM is executed. Accordingly, air including a large amount of oxygen is supplied from the intake pipe 31 to the GPF 33 on the exhaust pipe 32 due to pumping of the piston 12, and thus combustion of PM deposited in the GPF 33 can be promoted.

In addition, the vehicle V has a plurality of sensors 41 to 43 for detecting states of the engine 1, the GPF 33, and the like.

The water temperature sensor 41 detects a temperature of cooling water for cooling the engine 1 and transmits a signal according to the detected value to the ECU 7. The ECU 7 acquires the engine water temperature [° C.] that is the cooling water temperature of the engine 1 by using the detection signal of the water temperature sensor 41.

The vehicle speed sensor 42 transmits a pulse signal according to the rotation speed of the vehicle shaft connected to the drive wheels W to the ECU 7. The ECU 7 calculates the vehicle speed [km/h] of the vehicle V by using the pulse signal transmitted from the vehicle speed sensor 42.

The exhaust temperature sensor 43 is provided on the downstream side of the GPF 33 on the exhaust pipe 32. The exhaust temperature sensor 43 detects a temperature of exhaust flowing out from the GPF 33 and transmits a signal according to the detected value to the ECU 7. The ECU 7 acquires the temperature of the exhaust flowing out from the GPF 33 by using the detection signal of the exhaust temperature sensor 43 and further estimates a filter temperature that is a temperature of the GPF 33 through an arithmetic operation, which is not illustrated, based on the temperature of the exhaust. Therefore, a temperature acquisition unit of the present embodiment is constituted by the exhaust temperature sensor 43 and the ECU 7.

Further, although the filter temperature is estimated by using the detection signal of the exhaust temperature sensor 43 in the present embodiment, the present disclosure is not limited thereto. For example, the filter temperature may be directly acquired by providing a temperature sensor that is in direct contact with the GPF 33.

Figure 4:
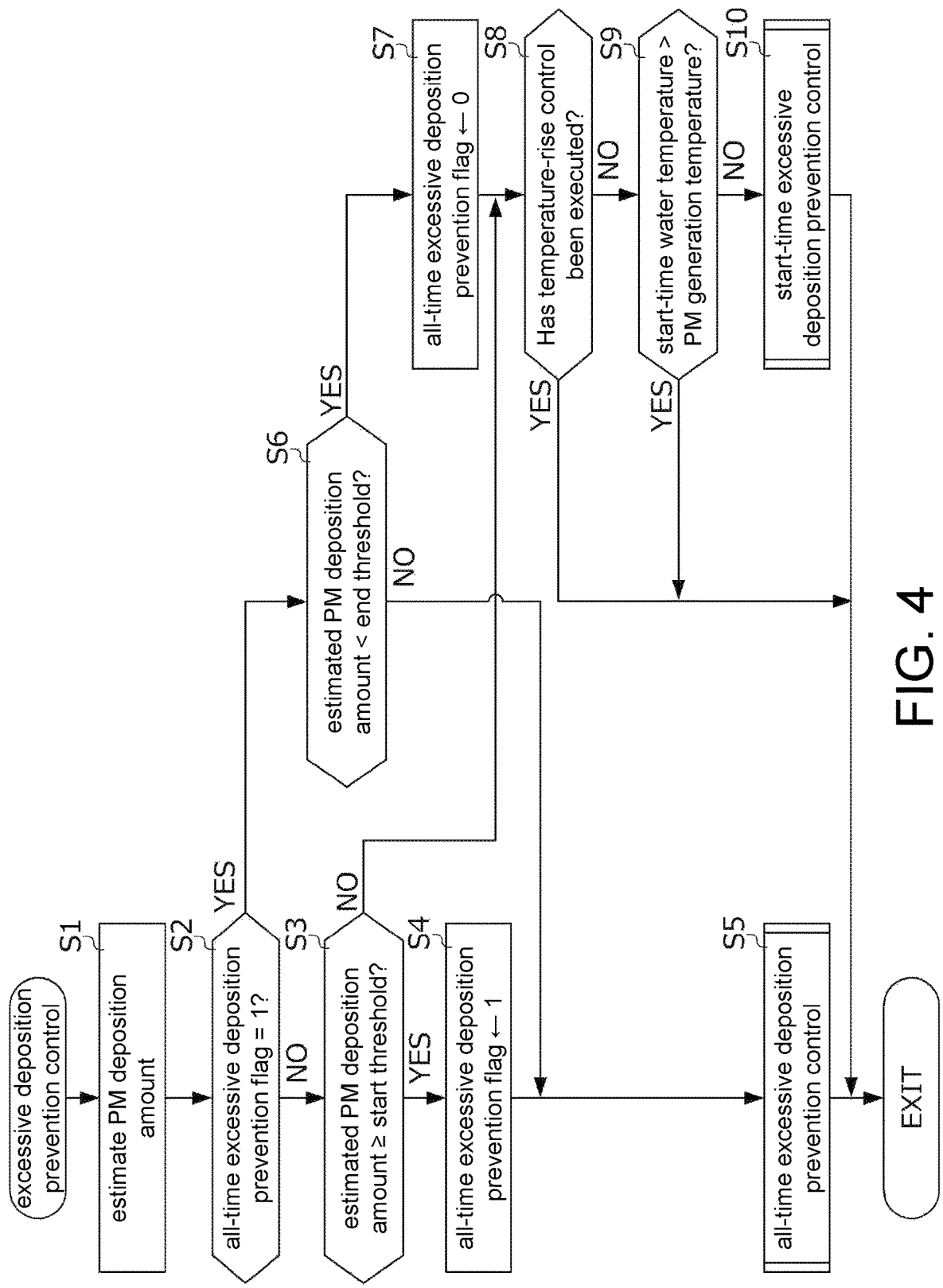
FIG. 4 is a flowchart showing the detailed procedure for excessive deposition prevention control.

FIG. 4 is a flowchart showing the detailed procedure for excessive deposition prevention control for preventing excessive deposition in the GPF 33. The excessive deposition prevention control of FIG. 4 is repeatedly executed by the ECU 7 in a driving cycle from when the vehicle is started according to an operation of an ignition switch, which is not illustrated, by a driver until the vehicle is stopped according to another operation of the ignition switch thereafter in every predetermined control period.

Figure 5:
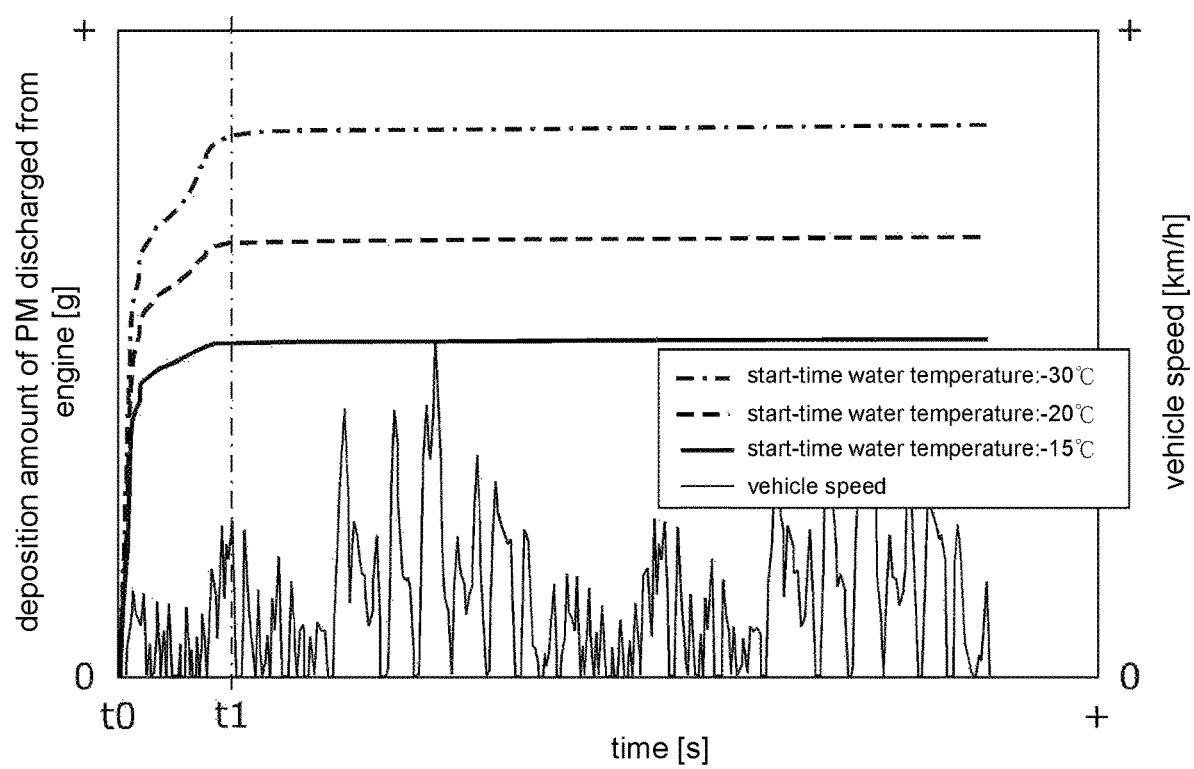
FIG. 5 is a diagram illustrating temporal changes of the accumulation amount of PM discharged from the engine.

FIG. 5 is a graph showing temporal changes of the integration amount [g] of PM discharged from the engine 1 in travel modes indicated by fine lines. FIG. 5 illustrates the temporal changes of the integration amount of PM in a case in which the engine water temperature when the engine is started (which will be referred to as a "start-time water temperature" below) is changed to −15° C., −20° C., and −30° C. with different types of lines.

As illustrated in FIG. 5, the integration amount of PM sharply increases immediately after the engine 1 is started at the time t0 and then gently increases from the time t1 at which warm-up of the engine 1 is completed. That is, the amount of PM discharged from the engine 1 after warm-up is sufficiently smaller than the amount of PM discharged from the engine 1 before warm-up is completed. In addition, as illustrated in FIG. 5, the integration amount of PM discharged until warm-up of the engine 1 is completed increases as the start-time water temperature becomes lower. Since the integration amount of PM discharged from the engine 1 is more likely to increase immediately after the start of the engine, particularly in a low-temperature environment as described above, the vehicle easily enters the excessive deposition state. For this reason, the excessive deposition prevention control according to the present embodiment is constituted by start-time excessive deposition prevention control (see S10) for executing the motor drive control focusing on the time immediately after the start of the engine at which the filter easily enters the excessive deposition state and all-time excessive deposition prevention control (see S5) for executing the motor drive control regardless of a time when the PM deposition amount increases as illustrated in FIG. 4.

First, in S1, the ECU 7 calculates an estimated PM deposition amount [g] corresponding to the estimated value of the current PM deposition amount in the GPF, and the process proceeds to S2.

Figure 6:
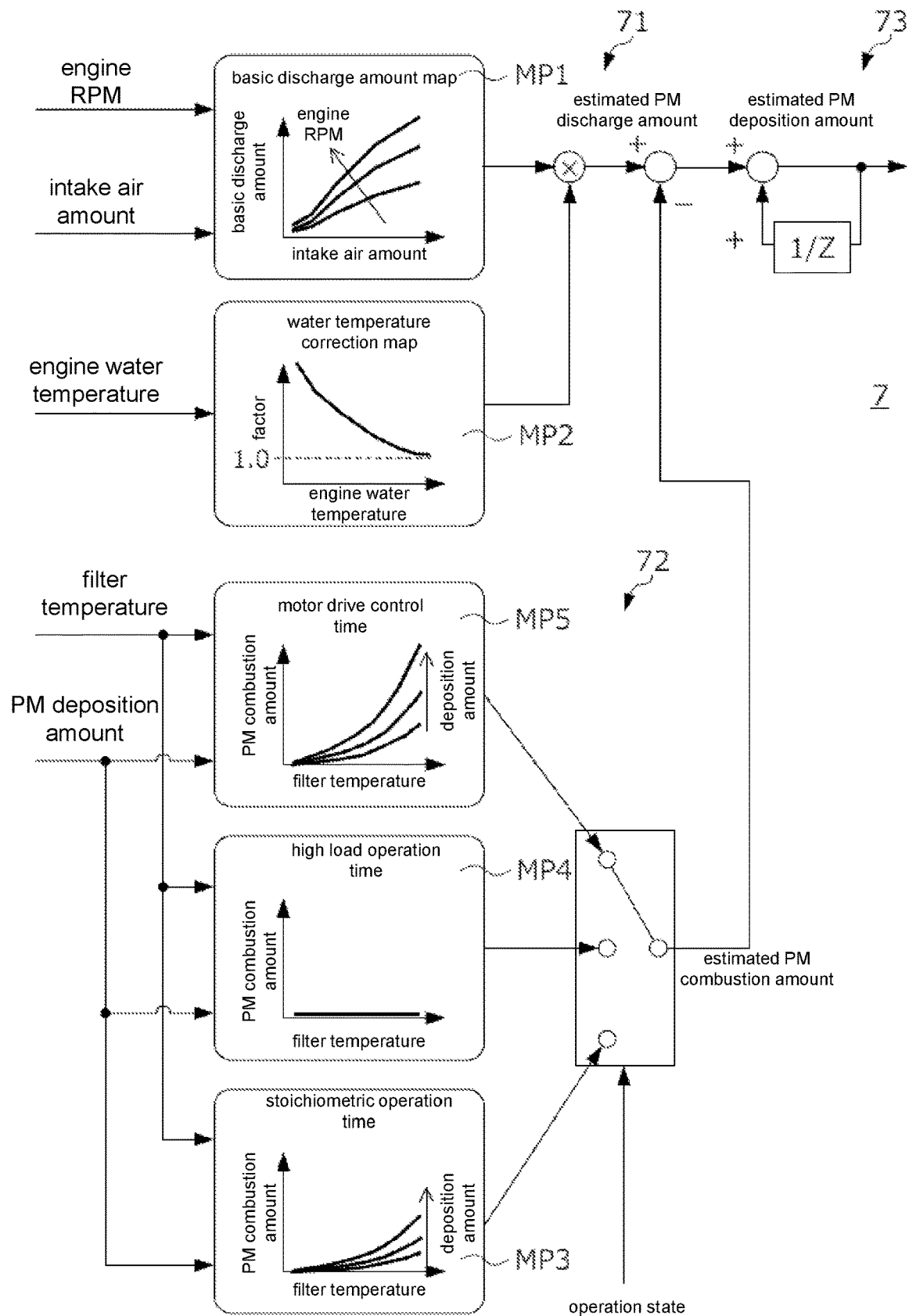
FIG. 6 is a diagram illustrating the detailed procedure for calculating the estimated PM deposition amount.

FIG. 6 is a diagram illustrating the detailed procedure for calculating the estimated PM deposition amount by the ECU 7. The ECU 7 includes a discharge amount estimation unit 71 that calculates an estimated PM discharge amount [g/s] corresponding to the estimated value of the PM discharge amount, a combustion amount estimation unit 72 that calculates an estimated PM combustion amount [g/s] corresponding to the estimated value of the PM combustion amount, and an integration unit 73 that calculates an estimated PM deposition amount by integrating the difference between the calculated estimated PM discharge amount and estimated PM combustion amount. The ECU 7 calculates the estimated PM deposition amount by repeatedly executing calculation with the discharge amount estimation unit 71, the combustion amount estimation unit 72, and the integration unit 73 in every predetermined control period.

The PM discharge amount changes according to the operation state of the engine 1. Thus, the discharge amount estimation unit 71 calculates a basic discharge amount by inputting the engine RPM that is a parameter for specifying the operation state of the engine 1 and the intake air amount of the engine 1 into a basic discharge amount map MP1, calculates a water temperature correction factor that is 1.0 or higher by inputting an engine water temperature that is a parameter for specifying an operation state of the engine 1 into a water temperature correction map MP2, and further calculates an estimated PM discharge amount by multiplying the basic discharge amount by the water temperature correction factor. According to the basic discharge amount map MP1, the basic discharge amount increases as the intake air amount increases, and the basic discharge amount increases as the engine RPM becomes higher as illustrated in FIG. 6. In addition, according to the water temperature correction map MP2, the water temperature correction factor has a higher value as the engine water temperature becomes lower, and the water temperature correction coefficient approaches 1.0 as the engine water temperature becomes higher. Therefore, the estimated PM discharge amount increases as the intake air amount increases; the estimated PM discharge amount increase as the engine RPM becomes higher; the estimated PM discharge amount decreases as the engine water temperature becomes higher.

The PM combustion amount changes according to the PM deposition amount and the filter temperature of the GPF 33. More specifically, the PM combustion amount increases as the PM deposition amount increases and the filter temperature becomes higher. In addition, the PM combustion amount changes according to an operation state of the engine 1. Thus, in the combustion amount estimation unit 72, a PM combustion amount map is defined for each operation state of the engine 1, wherein the PM combustion amount map outputs the PM combustion amount per unit time by receiving input of the PM deposition amount and the filter temperature. More specifically, an operation state of the engine 1 is divided into a stoichiometric operation time in which an air-fuel ratio is set as a theoretical air-fuel ratio, a high load operation time in which an air-fuel ratio is set to be richer than a theoretical air-fuel ratio, and a motor drive control time in which air is supplied to the GPF 33 with a fuel injection amount set to 0. In the combustion amount estimation unit 72, a PM combustion amount map MP3 for the stoichiometric operation time, a PM combustion amount map MP4 for the high load operation time, and a PM combustion amount map MP5 for the motor drive control time are defined.

As illustrated in FIG. 6, according to the PM combustion amount map MP3 for the stoichiometric operation time, the PM combustion amount increases as the PM deposition amount becomes larger and the filter temperature becomes higher as described above. In addition, in the high load operation time, the air-fuel ratio becomes richer than the theoretical air-fuel ratio, the concentration of oxygen in exhaust becomes lower than in the stoichiometric operation time, and thus PM captured in the GPF 33 is hardly combusted. Therefore, according to the PM combustion amount map MP4 for the high load operation time, the PM combustion amount is substantially zero regardless of the PM deposition amount and the filter temperature. In addition, a larger amount of oxygen is supplied to the GPF 33 in the motor drive control time than in the stoichiometric operation. Therefore, according to the PM combustion amount map MP5 for the motor drive control time, the PM combustion amount is larger than in the stoichiometric operation time.

The combustion amount estimation unit 72 selects one among the PM combustion amount maps MP3 to MP5 according to the current operation state of the engine 1 and calculates an estimated PM combustion amount by inputting a filter temperature acquired based on a detection signal of the exhaust temperature sensor 43 and a previous value of the estimated PM deposition amount into the selected PM combustion amount map.

The integration unit 73 calculates the estimated PM deposition amount by integrating the results of subtraction of the estimated PM combustion amount calculated by the combustion amount estimation unit 72 from the estimated PM discharge amount calculated by the discharge amount estimation unit 71.

Returning to FIG. 4, the ECU 7 determines whether the value of an all-time excessive deposition prevention flag is 1 in S2. The all-time excessive deposition prevention flag is a flag indicating that the all-time excessive deposition prevention control (see S5), which will be described below, is being executed, and is set to 1 when the estimated PM deposition amount is a start threshold or greater (see S4 which will be described below) and is reset to 0 thereafter when the estimated PM deposition amount is smaller than an end threshold (see S7 which will be described below) or the vehicle stops. The ECU 7 proceeds to S3 when the determination result of S2 is NO and proceeds to S6 when the determination result is YES.

In S3, the ECU 7 determines whether the estimated PM deposition amount is the start threshold [g] set for determining an execution start time of the all-time excessive deposition prevention control or greater. When the determination result of S3 is YES, the ECU 7 determines that it is time to start the all-time excessive deposition prevention control, sets the value of the all-time excessive deposition prevention flag to 1 (see S4), and starts the all-time excessive deposition prevention control (see S5). Accordingly, the PM deposition amount gradually decreases thereafter. Further, the specific procedure for the all-time excessive deposition prevention control will be described below with reference to FIG. 7. In addition, when the determination result of S3 is NO, the ECU 7 proceeds to S8. Further, the start threshold is set to be equal to or a value close to an allowable upper limit amount determined to prevent melting damage of the GPF.

In S6, the ECU 7 determines whether the estimated PM deposition amount is smaller than the end threshold [g] set to determine an execution end time of the all-time excessive deposition prevention control. When the determination result of S6 is NO, the ECU 7 proceeds to S5 to continuously execute the all-time excessive deposition prevention control. In addition, when the determination result of S6 is YES, the ECU 7 determines that it is time to end the all-time excessive deposition prevention control, resets the value of the all-time excessive deposition prevention flag to 0 (see S7), and proceeds to S8. Here, the end threshold is set to a value smaller than the above-described start threshold. Accordingly, when the estimated PM deposition amount exceeds the start threshold, the all-time excessive deposition prevention control is executed until the estimated PM deposition amount becomes the end threshold or smaller.

Next, in S8, the ECU 7 determines whether temperature rise control for raising the temperature of the engine 1 and exhaust thereof has been executed from the start of the vehicle to the current time point. In the temperature rise control, the ECU 7 raises the temperature of the engine 1 and the exhaust by delaying the spark time by the spark plug 14, the fuel injection time by the fuel injection valve 13, or the like to be later than a time determined at the time of a normal operation. When the temperature rise control has been executed after the start of the engine 1, the temperature of the GPF 33 becomes higher than the temperature at which PM is combusted, and thus it is determined that there is no concern of excessive deposition occurring in the GPF 33. Thus, when the determination result of S8 is YES, the ECU 7 immediately ends the process of FIG. 4 without executing the following process, and when the determination result is NO, the ECU 7 proceeds to S9.

Further, the ECU 7 increases the temperature of the engine 1, exhaust, the GPF 33 provided on the exhaust pipe 32, an exhaust purification catalyst which is not illustrated, and the like by executing the temperature rise control when the start-time water temperature is in a temperature rise range between a predetermined temperature-rise lower limit temperature (e.g., −10° C.) and a predetermined temperature-rise upper limit temperature (e.g., 80° C.), and thus promptly increases fuel efficiency and exhaust purification performance. Further, the temperature rise control is preferably executed even when the start-time water temperature is equal to or lower than the temperature-rise lower limit temperature. However, when the start-time water temperature is lower than the temperature-rise lower limit temperature, it is not possible to sufficiently increase the temperature of the engine 1, exhaust, and the like even if the temperature rise control is executed, and thus there is concern of fuel efficiency deteriorating. Thus, when the start-time water temperature is equal to or lower than the temperature-rise lower limit temperature, the ECU 7 does not execute the temperature rise control. Therefore, the ECU 7 executes the start-time excessive deposition prevention control which will be described below (see S10 which will be described below) at least under the condition that the start-time water temperature is equal to or lower than temperature-rise lower limit temperature.

Next in S9, the ECU 7 acquires the start-time water temperature and determines whether the start-time water temperature is higher than a predetermined PM generation temperature (e.g., 80° C.). The PM discharge amount [g/s] of the engine 1 is characteristic in that it decreases as the start-time water temperature becomes higher and becomes substantially 0 as the start-time water temperature becomes higher than the PM generation temperature. Thus, when the determination result of S9 is YES (i.e., when the start-time water temperature is higher than the PM generation temperature), the ECU 7 determines that PM is hardly discharged from the engine 1 after the start of the engine 1 to the current time point, and immediately ends the process of FIG. 4 without executing the following process. In addition, when the determination result of S9 is NO, the ECU 7 proceeds to S10 and executes the start-time excessive deposition prevention control. The specific procedure for the start-time excessive deposition prevention control will be described below with reference to FIG. 8.

Figure 7:
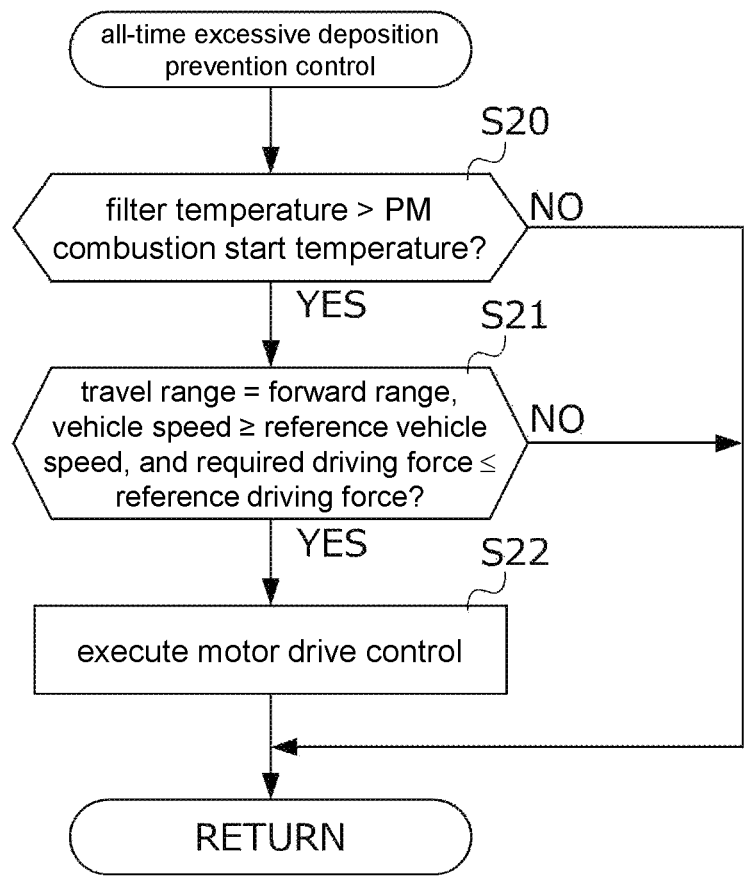
FIG. 7 is a flowchart showing the detailed procedure for all-time excessive deposition prevention control.

FIG. 7 is a flowchart showing the detailed procedure for the all-time excessive deposition prevention control. First in S20, the ECU 7 acquires the filter temperature that is the temperature of the GPF 33 and determines whether the filter temperature is higher than or equal to a predetermined PM combustion start temperature (e.g., 350° C.). If the temperature of the GPF 33 is lower than the PM combustion start temperature, the motor drive control, which will be described below, is executed and PM will not be combusted even if air is supplied to the GPF 33. For this reason, if the determination result of S20 is NO (i.e., the filter temperature is lower than the PM combustion start temperature), the ECU 7 determines that PM will not be combusted in the GPF 33 and immediately ends the process of FIG. 7 without executing the following process, and if the determination result is YES, the ECU 7 proceeds to S21.

Next in S21, the ECU 7 determines whether the travel range is the forward range, the vehicle speed is higher than or equal to a predetermined reference vehicle speed, and the driving force required by the driver is smaller than a predetermined reference driving force. If the travel range is not the forward range or the vehicle speed is lower than the reference vehicle speed, it is difficult to supply a sufficient amount of air to the GPF 33 even if motor drive control is executed, and thus the effect of combusting PM is small. Since a driving force is not generated by the engine 1 in motor drive control, if motor drive control is executed with a driving force required to be greater than a reference driving force, it is not possible to generate a driving force according to the required driving force only with the drive motor TM, power performance of the vehicle V may deteriorate. Thus, if the determination result of S21 is NO, the ECU 7 immediately ends the process of FIG. 7 without performing the following process, and if the determination result is YES, the ECU 7 proceeds to S22.

Next in S22, the ECU 7 stops fuel injection from the fuel injection valve 13, executes motor drive control for rotating the crank shaft 17 with the generator motor GM, and ends the process of FIG. 7. Accordingly, air is supplied to the GPF 33 which has reached at least a high temperature that is higher than or equal to the PM combustion temperature, and thus combustion of PM captured by the GPF 33 is promoted.

Figure 8:
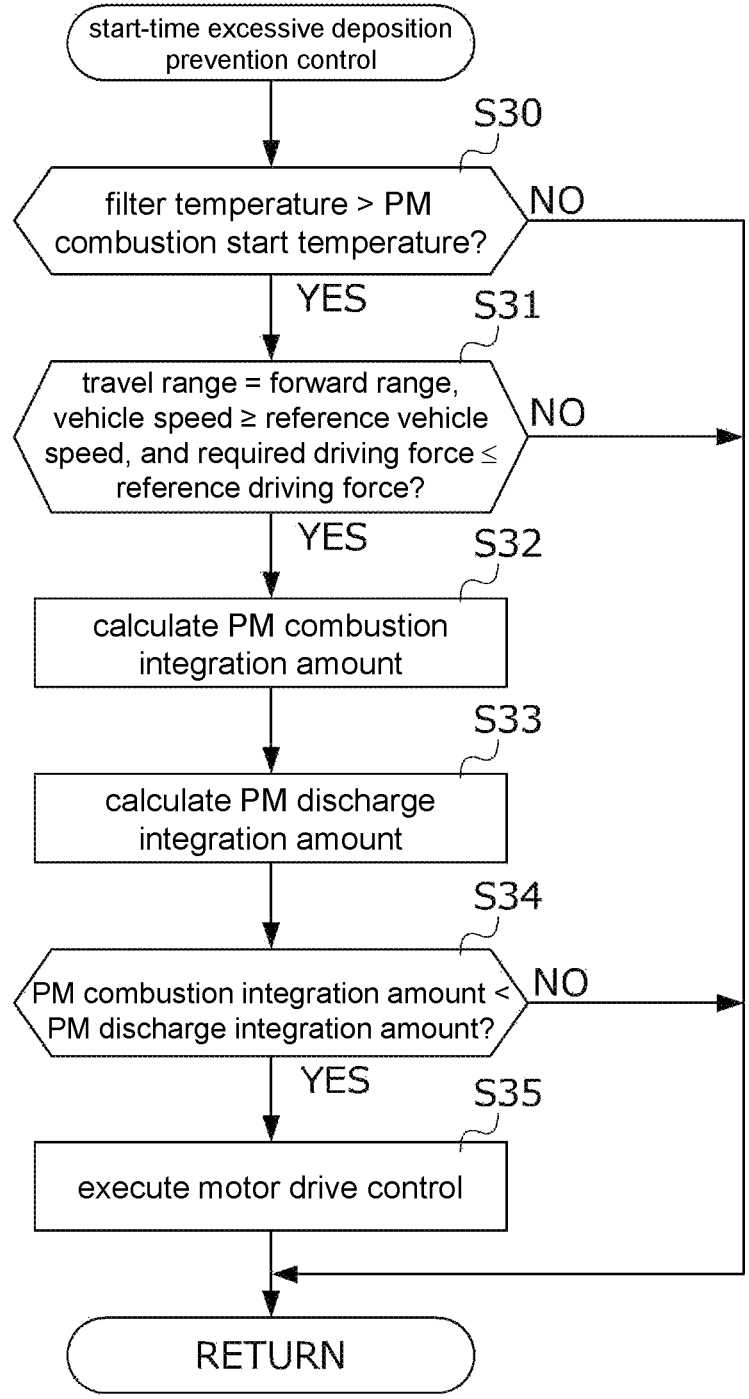
FIG. 8 is a flowchart showing the detailed procedure for start-time excessive deposition prevention control.

FIG. 8 is a flowchart showing the detailed procedure for start-time excessive deposition prevention control. First in S30, the ECU 7 determines whether the filter temperature is higher than or equal to the PM combustion start temperature through the same procedure as the process of S20 of FIG. 7. If the determination result of S30 is NO, the ECU 7 immediately ends the process of FIG. 8 without executing the following process, and if the determination result is YES, the ECU 7 proceeds to S31.

Next in S31, the ECU 7 determines whether the travel range is the forward range, the vehicle speed is higher than or equal to the reference vehicle speed, and the driving force required by the driver is smaller than the reference driving force through the same procedure as the process of S21 of FIG. 7. If the determination result of S31 is NO, the ECU 7 immediately ends the process of FIG. 8 without executing the following process, and if the determination result is YES, the ECU 7 proceeds to S32.

Next in S32, the ECU 7 calculates the PM combustion integration amount [g] corresponding to the estimated value of the integration amount of PM combusted in the GPF 33 from the engine start to the current time point, and proceeds to S33.

Figure 9:
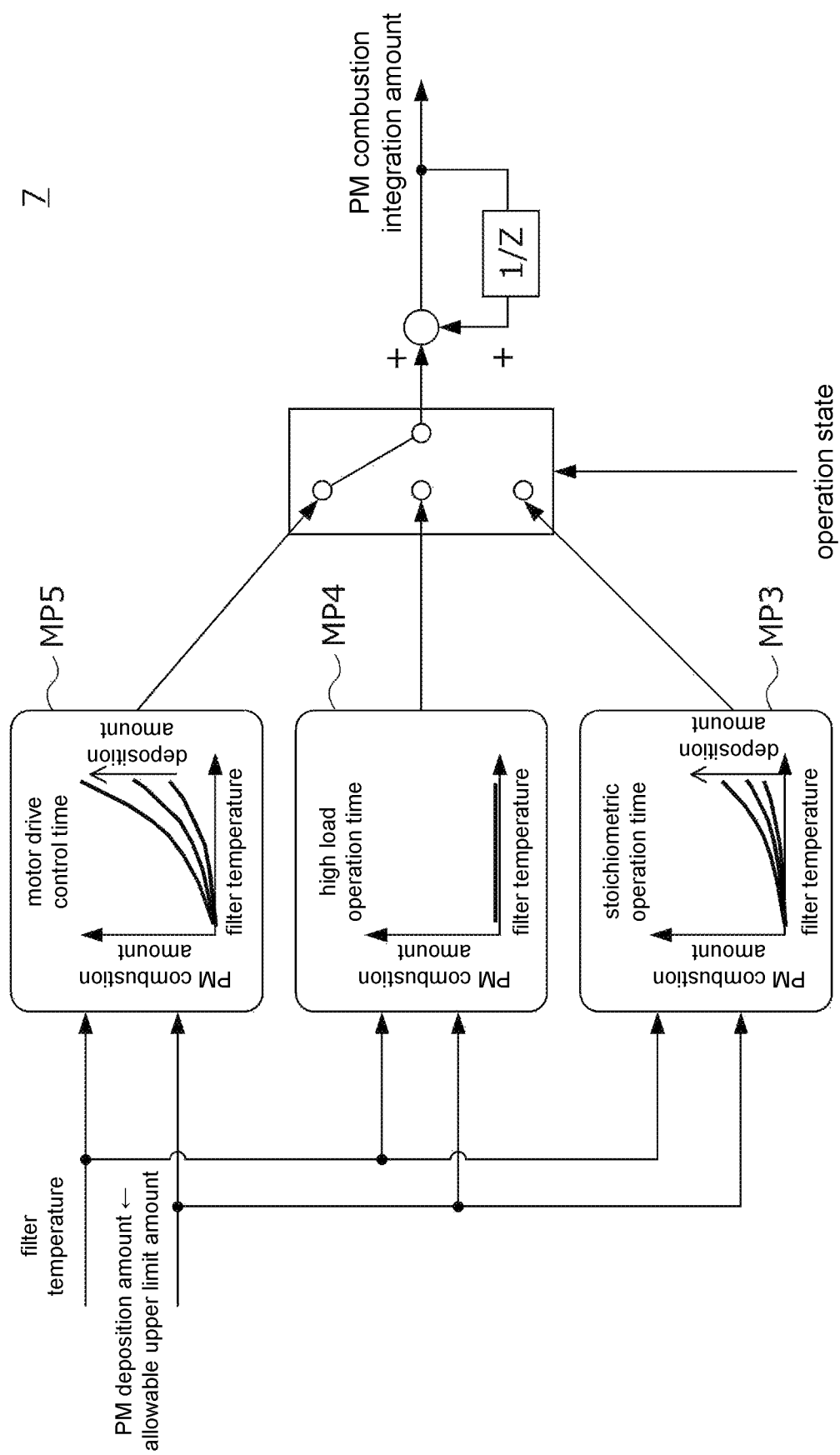
FIG. 9 is a diagram illustrating the detailed procedure for calculating a PM combustion integration amount.

FIG. 9 is a diagram illustrating the detailed procedure for calculating the PM combustion integration amount by the ECU 7. The ECU 7 calculates the PM combustion integration amount by acquiring the filter temperature acquired based on the detection signal of the exhaust temperature sensor 43 and the operation state of the engine 1 and repeatedly executing the arithmetic operation shown in FIG. 9 based on the filter temperature and the operation state in every predetermined control period.

The ECU 7 calculates the PM combustion integration amount using the PM combustion amount maps MP3 to MP5 described with reference to FIG. 6. More specifically, the ECU 7 calculates the PM combustion amount by selecting one among the PM combustion amount maps MP3 to MP5 according to the current operation state of the engine 1 and inputting the filter temperature acquired based on the detection signal of the exhaust temperature sensor 43 and the PM deposition amount into the selected PM combustion amount map and calculates the PM combustion integration amount by integrating the PM combustion amounts.

Further, when calculating the PM combustion integration amount using the PM combustion amount maps MP3 to MP5, it is desirable for the ECU 7 to input an allowable upper limit amount that is a predetermined fixed value to the PM combustion amount maps MP3 to MP5, rather than the actual PM deposition amount as a PM deposition amount. In other words, it is desirable for the ECU 7 to calculate the PM combustion integration amount on the assumption that the allowable upper limit amount of PM has been deposited in the filter. Since the greater the PM deposition amount is in the GPF 33, the greater the PM combustion amount is for the GPF 33 as described above, the PM combustion integration amount is estimated to be greater than the actual amount. Thus, the execution frequency of motor drive control (see S35), which will be described below, becomes lower than the case in which the PM combustion integration amount is calculated using the actual PM deposition amount, and therefore, waste of energy such as a fuel and electric power for executing motor drive control can be curbed accordingly. However, while there is concern of the PM deposition amount increasing in the GPF 33 due to the low execution frequency of motor drive control in this case, the PM combustion integration amount is calculated on the assumption that the allowable upper limit amount of PM has been deposited in the GPF 33 as described above, and thus it is possible to prevent the actual PM deposition amount from exceeding the allowable upper limit amount.

Returning to FIG. 8, in S33, the ECU 7 calculates the PM discharge integration amount [g] that is the threshold with respect to the PM combustion integration amount and proceeds to S34. The PM discharge integration amount corresponds to the estimated value of the integration amount of PM discharged from the start of the engine 1.

Figure 10:
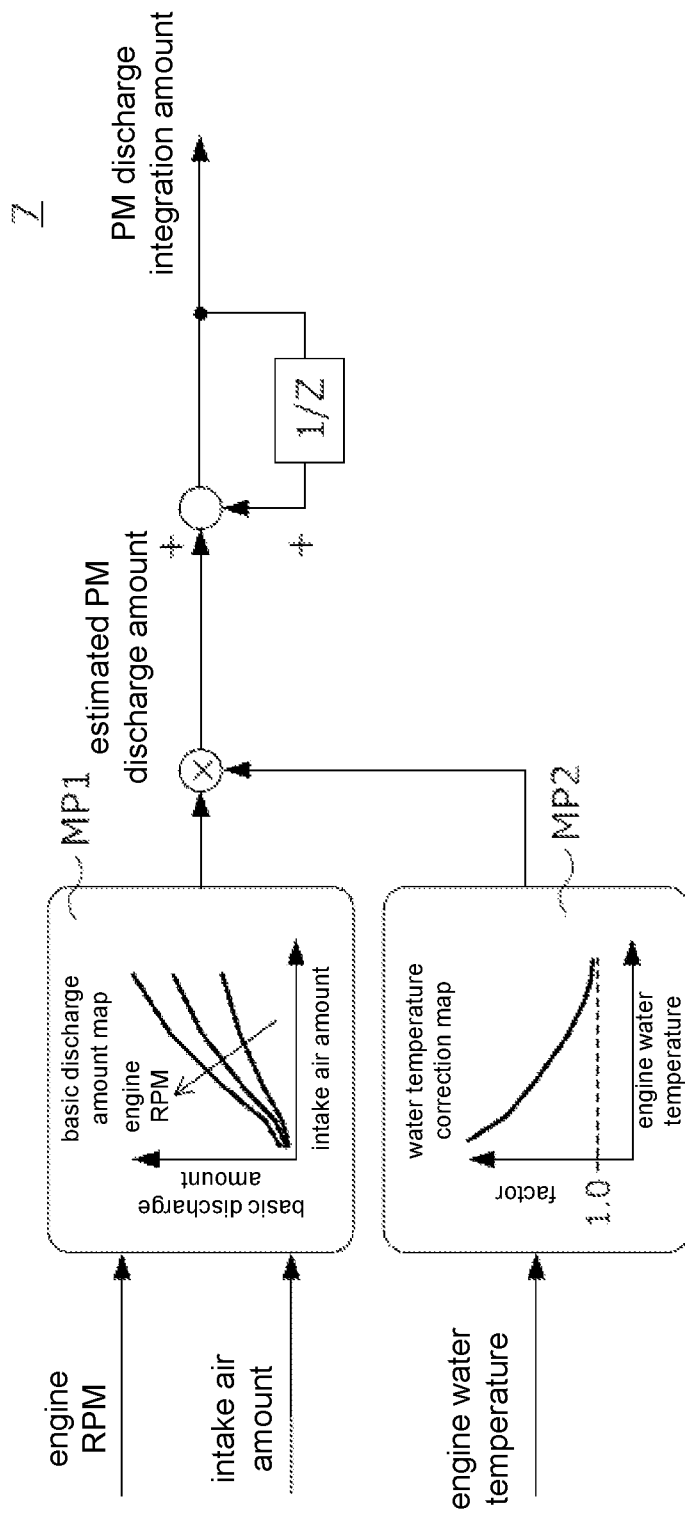
FIG. 10 is a diagram illustrating the detailed procedure for calculating a PM discharge integration amount.

FIG. 10 is a diagram illustrating the detailed procedure for calculating the PM discharge integration amount by the ECU 7. The ECU 7 calculates the PM discharge integration amount based on an engine RPM, an intake air amount of the engine 1, and an engine water temperature. More specifically, the ECU 7 calculates the PM discharge integration amount using the basic discharge amount map MP1 and the water temperature correction map MP2 described with reference to FIG. 6. More specifically, the ECU 7 calculates the basic discharge amount by inputting the engine RPM and the intake air amount into the basic discharge amount map MP1, calculates a water temperature correction factor by inputting the engine water temperature into the water temperature correction map MP2, calculates the estimated PM discharge amount by multiplying the basic discharge amount by the water temperature correction factor, and further calculates the PM discharge integration amount by integrating the estimated PM discharge amounts.

Returning to FIG. 8, in S34, the ECU 7 determines whether the PM combustion integration amount calculated in S32 is less than the PM discharge integration amount calculated in S33. If the determination result of S34 is YES, the ECU 7 proceeds to S35, stops fuel injection from the fuel injection valve 13, executes motor drive control for rotating the crank shaft 17 with the generator motor GM, and ends the process of FIG. 8. Accordingly, since air is supplied to the GPF 33 that has reached at least a high temperature that is higher than or equal to the PM combustion temperature, and thus combustion of PM captured by the GPF 33 is promoted. In addition, if the determination result of S34 is NO, the ECU 7 immediately ends the process of FIG. 8 without executing motor drive control.

Figure 11:
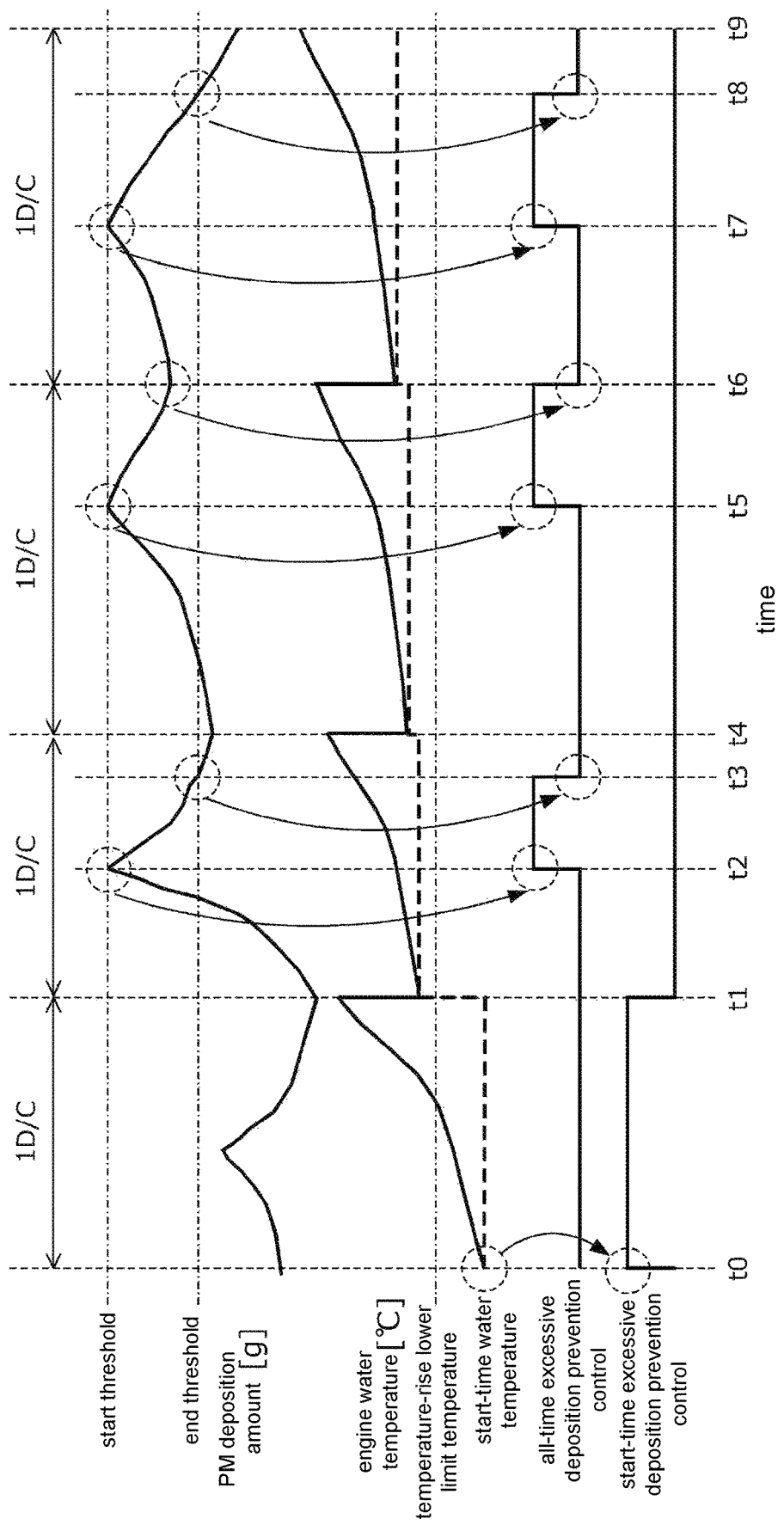
FIG. 11 is a time chart illustrating a specific example of excessive deposition prevention control.

FIG. 11 is a time chart illustrating a specific example of excessive deposition prevention control described above. In FIG. 11, the PM deposition amount, the engine water temperature, the execution and non-execution of the all-time excessive deposition prevention control, and the execution and non-execution of start-time excessive deposition prevention control through the 4 driving cycles (times t0 to t1, times t1 to t4, times t4 to t6, and times t6 to t9) are illustrated.

In the driving cycle of the times t0 to t1, the start-time water temperature is lower than the temperature-rise lower limit temperature that is the lower limit of the temperature range in which temperature rise control is executed. In this case, since the PM discharge amount immediately after the start of the engine 1 is large and temperature rise control has not been executed, the filter easily enters the excessive deposition state as described with reference to FIG. 5. For this reason, the ECU 7 executes the start-time excessive deposition prevention control (see S10) in the driving cycle of the times t0 to t1. In the start-time excessive deposition prevention control, the motor drive control is executed (see S35) if the predetermined conditions (see S30 and S31) are satisfied and the PM combustion integration amount is smaller than the PM discharge integration amount (see S34), and thus combustion of PM in the GPF 33 is promoted to avoid the excessive deposition state.

Since the start-time water temperature is higher than the temperature-rise lower limit temperature in the driving cycle of the times t1 to t4, the start-time excessive deposition prevention control is not executed in the driving cycle of the times t1 to t4. In addition, in this driving cycle, the ECU 7 executes the all-time excessive deposition prevention control at the time t2 according to the PM deposition amount exceeding the start threshold set close to the allowable upper limit amount (see S5). In the all-time excessive deposition prevention control, the ECU 7 executes the motor drive control (see S22) when the predetermined conditions (see S20 and S21) are satisfied, and thus the combustion of PM in the GPF 33 is promoted to avoid the excessive deposition state. After the all-time excessive deposition prevention control is started as described above, the ECU 7 ends the all-time excessive deposition prevention control (see S6) at the time t3 according to the PM deposition amount lower than an end threshold.

Since the start-time water temperature is higher than the temperature-rise lower limit temperature in the driving cycle of the times t4 to t6, the start-time excessive deposition prevention control is not executed in the driving cycle of the times t4 to t6. In addition, in the driving cycle, the ECU 7 executes the all-time excessive deposition prevention control (see S5) at the time t5 according to the PM deposition amount exceeding the start threshold. Accordingly, while the PM deposition amount turns to decrease as in the driving cycle of the times t1 to t4, the vehicle stops before the PM deposition amount reaches the end threshold at the time t6. In this case, the ECU 7 resets the value of the all-time excessive deposition prevention flag to 0 as described above. Thus, in the next driving cycle, the all-time excessive deposition prevention control is not continuously executed.

Since the start-time water temperature is higher than the temperature-rise lower limit temperature in the driving cycle of the times t6 to t9, the start-time excessive deposition prevention control is not executed in the driving cycle of the times t6 to t9. In addition, since the PM deposition amount exceeds the start threshold at the time t7 in this driving cycle, the ECU 7 thereafter executes the all-time excessive deposition prevention control (see S5) at the time t8 until the PM deposition amount becomes smaller than the end threshold.

The following effects can be exhibited according to the vehicle V of the present embodiment. (1) The vehicle V performs the motor drive control (see S35) for rotating the crank shaft 17 of the engine 1 with the generator motor GM if a filter temperature is higher than or equal to the PM combustion start temperature and the PM combustion integration amount is smaller than the PM discharge integration amount. Accordingly, in the state in which the PM combustion integration amount is smaller than the PM discharge integration amount, that is, when PM needs to be actively combusted to prevent excessive deposition, the motor drive control is executed, and combustion of PM deposited in the GPF 33 can be promoted. In addition, in the state in which the PM combustion integration amount is greater than or equal to the PM discharge integration amount, that is, the state in which most PM captured in the GPF 33 has already been combusted and excessive deposition has not occurred, the motor drive control can be prevented. Accordingly, waste of energy such as a fuel and electric power for executing the motor drive control can be curbed.

(2) PM particularly increases immediately after the start of the engine 1 and is discharged from the engine 1. Thus, the ECU 7 calculates the PM combustion integration amount that is the integration amount of PM combusted in the GPF 33 in the period immediately after the start of the engine when a particularly large amount of PM can be discharged to the current time point, and executes the motor drive control by comparing the PM combustion integration amount with the PM discharge integration amount. Accordingly, the motor drive control can be executed at the right time and further waste of energy needed for executing the motor drive control can be curbed. In addition, the ECU 7 assumes that the allowable upper limit amount of PM has been deposited in the GPF 33 when calculating the PM combustion integration amount. Accordingly, the execution frequency of the motor drive control is lower than when the PM combustion integration amount is calculated using the actual PM deposition amount according to the present embodiment, and thus waste of energy such as a fuel and electric power for executing the motor drive control can be curbed accordingly. However, while there is concern of the PM deposition amount increasing in the GPF 33 due to the low execution frequency of the motor drive control in this case, the PM combustion integration amount is calculated on the assumption that the allowable upper limit amount of PM has been deposited in the GPF 33 in the above-described present embodiment, and thus it is possible to prevent the actual PM deposition amount from exceeding the allowable upper limit amount.

(3) The ECU 7 calculates the PM combustion integration amount based on the filter temperature and the operation state of the engine 1 which are correlated with the PM combustion integration amount. Accordingly, since the PM combustion integration amount can be calculated with high accuracy, the motor drive control can be executed at the right time, and further waste of energy needed for executing the motor drive control can be curbed.

(4) As described with reference to FIG. 5, the integration amount of PM discharged from the start of the engine 1 significantly increases in the process of warm-up of the engine. Thus, the ECU 7 sets the PM discharge integration amount that is the integration amount of PM discharged from the start of the engine as a threshold with respect to the PM combustion integration amount and determines whether to execute the motor drive control (see S34). Accordingly, in the process of warm-up of the engine 1 in which the PM deposition amount is likely to significantly increase, the motor drive control can be executed at the right time.

(5) The ECU 7 calculates the PM discharge integration amount based on the engine RPM, the intake air amount, and the engine water temperature. Accordingly, since the PM discharge integration amount can be calculated with high accuracy, the motor drive control can be executed at the right time, and further waste of energy needed for executing the motor drive control can be curbed.

(6) When the start-time water temperature is in the temperature-rise range between the temperature-rise lower limit temperature and the temperature-rise upper limit temperature, the ECU 7 raises the temperatures of the engine 1 and exhaust thereof by executing the temperature rise control and further improves the exhaust purification performance of the GPF 33. In addition, the temperature of exhaust increases when the temperature rise control is executed, and thus PM captured in the GPF 33 is combusted as well. However, when the start-time water temperature is lower than the temperature-rise lower limit temperature, it is not possible to improve the exhaust purification performance in an early stage even if the temperature rise control is executed, there is concern of fuel efficiency deteriorating, and therefore, the ECU 7 does not execute the temperature rise control. Thus, when the start-time water temperature is equal to or lower than the temperature-rise lower limit temperature and the temperature rise control is not executed, the ECU 7 performs the motor drive control. Accordingly, excessive deposition in the GPF 33 can be prevented at the time of a low-temperature start of the vehicle V at which the PM deposition amount easily increases in the GPF 33.

(7) When the start-time water temperature is in the temperature-rise range as described above, while the temperature rise control is executed, the PM deposition amount of the GPF 33 may gently increase and exceed the allowable upper limit amount. Thus, when the PM deposition amount exceeds the start threshold set near the allowable upper limit amount in a state in which the start-time water temperature is higher than or equal to the temperature-rise lower limit temperature, the ECU 7 performs the motor drive control until the PM deposition amount becomes equal to or smaller than the end threshold. Accordingly, it is possible to prevent the PM deposition amount from greatly exceeding the allowable upper limit amount.

(8) When the filter temperature is higher than or equal to the PM combustion start temperature and the PM combustion integration amount is smaller than the PM discharge integration amount, the ECU 7 performs the motor drive control for rotating the crank shaft 17 with the generator motor GM. Accordingly, the motor drive control can be performed at the right timing to prevent the saturated deposition amount from exceeding the allowable upper limit amount, that is, the GPF 33 does not come into the excessive deposition state.

(9) The ECU 7 executes the motor drive control on the condition that the travel range is the forward range, the vehicle speed is higher than or equal to the predetermined reference vehicle speed, and the required driving force is smaller than the predetermined reference driving force. Accordingly, the motor drive control can be executed without lowering the power performance of the vehicle, and further PM can be effectively combusted through the motor drive control.

Although the embodiment of the present disclosure has been described above, the present disclosure is not limited thereto. Detailed configurations of the present disclosure may be appropriately modified in the scope of the gist of the present disclosure.

What is claimed is:

1. A hybrid vehicle comprising:
   a filter provided on an exhaust passage of an engine to capture particulate matter included in exhaust;
   a motor connected to an output shaft of the engine;
   a temperature acquisition part acquiring a filter correlation temperature correlated with a temperature of the filter; and
   a control part performing motor drive control for rotating the output shaft with the motor when the filter correlation temperature is higher than or equal to a reference temperature and a particulate matter combustion amount that is an integration amount of the particulate matter combusted in the filter is smaller than a combustion amount threshold.

2. The hybrid vehicle according to claim 1,
   wherein the control part assumes that an allowable upper limit amount of particulate matter has been deposited in the filter, and calculates a combustion integration amount of particulate matter combusted from a start of the engine in the filter as the particulate matter combustion amount.

3. The hybrid vehicle according to claim 2,
   wherein the control part calculates the particulate matter combustion amount based on the filter correlation temperature and an operation state of the engine.

4. The hybrid vehicle according to claim 1,
   wherein the control part calculates a discharge integration amount of particulate matter discharged from a start of the engine as the combustion amount threshold.

5. The hybrid vehicle according to claim 2,
   wherein the control part calculates a discharge integration amount of particulate matter discharged from a start of the engine as the combustion amount threshold.

6. The hybrid vehicle according to claim 3,
   wherein the control part calculates a discharge integration amount of particulate matter discharged from a start of the engine as the combustion amount threshold.

7. The hybrid vehicle according to claim 4,
wherein the control part calculates the combustion amount threshold based on an engine RPM, an intake air amount, and an engine water temperature.

8. The hybrid vehicle according to claim 1,
wherein, when a start-time water temperature that is an engine water temperature at a time of a start of the engine is in a predetermined temperature-rise range, the control part executes temperature rise control for raising temperatures of the engine and exhaust of the engine, and
when the start-time water temperature is equal to or lower than a lower limit of the temperature-rise range, the control part executes the motor drive control.

9. The hybrid vehicle according to claim 2,
wherein, when a start-time water temperature that is an engine water temperature at a time of a start of the engine is in a predetermined temperature-rise range, the control part executes temperature rise control for raising temperatures of the engine and exhaust of the engine, and
when the start-time water temperature is equal to or lower than a lower limit of the temperature-rise range, the control part executes the motor drive control.

10. The hybrid vehicle according to claim 3,
wherein, when a start-time water temperature that is an engine water temperature at a time of a start of the engine is in a predetermined temperature-rise range, the control part executes temperature rise control for raising temperatures of the engine and exhaust of the engine, and
when the start-time water temperature is equal to or lower than a lower limit of the temperature-rise range, the control part executes the motor drive control.

11. The hybrid vehicle according to claim 4,
wherein, when a start-time water temperature that is an engine water temperature at a time of a start of the engine is in a predetermined temperature-rise range, the control part executes temperature rise control for raising temperatures of the engine and exhaust of the engine, and
when the start-time water temperature is equal to or lower than a lower limit of the temperature-rise range, the control part executes the motor drive control.

12. The hybrid vehicle according to claim 5,
wherein, when a start-time water temperature that is an engine water temperature at a time of a start of the engine is in a predetermined temperature-rise range, the control part executes temperature rise control for raising temperatures of the engine and exhaust of the engine, and
when the start-time water temperature is equal to or lower than a lower limit of the temperature-rise range, the control part executes the motor drive control.

13. The hybrid vehicle according to claim 8,
wherein the control part estimates a deposition amount of particulate matter in the filter and performs the motor drive control until the deposition amount becomes equal to or smaller than an end threshold when the deposition amount exceeds a start threshold in a state where the start-time water temperature is higher than or equal to the lower limit of the temperature-rise range.

14. The hybrid vehicle according to claim 1,
wherein the engine is a gasoline engine using gasoline as a fuel.

15. The hybrid vehicle according to claim 2,
wherein the engine is a gasoline engine using gasoline as a fuel.

16. The hybrid vehicle according to claim 3,
wherein the engine is a gasoline engine using gasoline as a fuel.

17. The hybrid vehicle according to claim 4,
wherein the engine is a gasoline engine using gasoline as a fuel.

18. The hybrid vehicle according to claim 5,
wherein the engine is a gasoline engine using gasoline as a fuel.

19. The hybrid vehicle according to claim 6,
wherein the engine is a gasoline engine using gasoline as a fuel.

20. The hybrid vehicle according to claim 1,
wherein the control part executes the motor drive control at least under conditions that a travel range is a forward range, a vehicle speed is higher than or equal to a predetermined reference vehicle speed, and a required driving force is smaller than a predetermined reference driving force.

* * * * *